(12) United States Patent
Azuma

(10) Patent No.: US 7,020,749 B2
(45) Date of Patent: Mar. 28, 2006

(54) SIGNAL PROCESSOR, PREFETCH INSTRUCTION METHOD AND PREFETCH INSTRUCTION PROGRAM

(75) Inventor: Tetsuhiko Azuma, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 344 days.

(21) Appl. No.: 10/453,723

(22) Filed: Jun. 4, 2003

(65) Prior Publication Data

US 2004/0181655 A1     Sep. 16, 2004

(30) Foreign Application Priority Data

Mar. 12, 2003   (JP)   ............... P2003-066443

(51) Int. Cl.
    *G06F 12/00*   (2006.01)
(52) U.S. Cl. ............... 711/137; 711/204; 711/213; 711/217; 712/241
(58) Field of Classification Search ........... 711/137, 711/204, 213, 217; 712/241
    See application file for complete search history.

(56) References Cited

U.S. PATENT DOCUMENTS

| 5,357,618 | A | * | 10/1994 | Mirza et al. ............... 711/3 |
| 5,752,037 | A |   | 5/1998  | Gornish et al. |
| 5,898,865 | A | * | 4/1999  | Mahalingaiah ............... 712/239 |
| 6,202,130 | B1|   | 3/2001  | Scales, III et al. |

FOREIGN PATENT DOCUMENTS

JP    10-207706    8/1998

\* cited by examiner

*Primary Examiner*—Matthew D. Anderson
*Assistant Examiner*—Hetul Patel
(74) *Attorney, Agent, or Firm*—Oblon, Spivak, McClelland, Maier & Neustadt, P.C.

(57) ABSTRACT

A signal processor including a processor having a cache memory and a process execution unit executing a process by use of information temporarily stored in the cache memory and an external memory provided external to the processor. In the signal processor, the process execution unit automatically returns to a start point of a loop-type data at an end of the loop-type data and sequentially reads out the loop-type data from the external memory to the cache memory.

8 Claims, 13 Drawing Sheets

FIG. 8

| IID | RNDA | RNDB | RNDC |

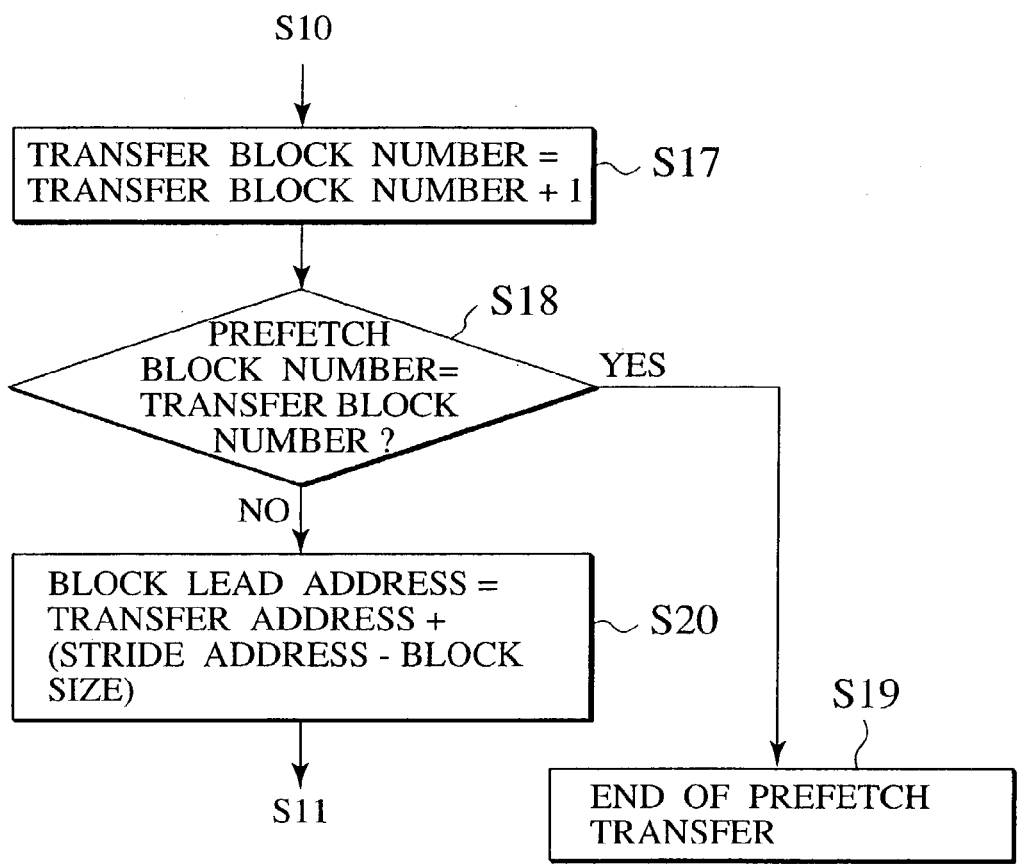

SIGNAL PROCESSOR, PREFETCH INSTRUCTION METHOD AND PREFETCH INSTRUCTION PROGRAM

CROSS REFERENCE TO RELATED APPLICATIONS

This application is based upon and claims the benefit of priority from prior Japanese Patent Application P2003-66443 filed on Mar. 12, 2003; the entire contents of which are incorporated by reference herein.

BACKGROUND OF THE INVENTION

1. Field of the Invention

The present invention relates to a signal processor, and further relates to a prefetch instruction method and a prefetch instruction program.

2. Description of the Related Art

At present, in a microprocessor or the like, a cache memory with a large capacity is mounted to efficiently and rapidly execute processing of multimedia data such as streaming video and audio. The cache memory is the most important technology for high speed processing of multimedia data because the cache memory is provided within a processor and operates at the same speed as the processor. On the other hand, the cache memory cannot store a large amount of data because it has a small capacity. Accordingly, the cache memory fetches and utilizes part of the data to be fetched from an external memory. It is efficient to fetch and store necessary data in the cache memory.

SUMMARY OF THE INVENTION

A first aspect of the present invention inheres in a signal processor including: a processor having a cache memory and a process execution unit executing a process by use of information temporarily stored in the cache memory; and an external memory provided external to the processor. In the signal processor, the process execution unit automatically returns to a start point of loop-type data at an end of the loop-type data and sequentially reads out the loop-type data from the external memory to the cache memory.

A second aspect of the present invention inheres in a computer implemented prefetch instruction method including: setting a start address in address data in an external memory; defining loop data having a predetermined data size from the start address; reading out loop end prefetch data at an end portion of the loop data in a data size within a prefetch area; automatically returning to a start point of the loop data and reading out loop start prefetch data; and sequentially transferring the loop data in the external memory to address data in a cache memory.

A third aspect of the present invention inheres in a computer implemented prefetch instruction method including: determining a loop start address and a loop end offset so as to assign a loop prefetch applied area, a loop prefetch not-applied area, and excluded data area in address data area in an external memory; specifying a prefetch start address in the loop prefetch not-applied area; reading out discrete block data by a block size in the loop prefetch not-applied area, by specifying a predetermined stride address from the prefetch start address; automatically returning to the loop start address on reaching an end of the loop prefetch applied area; and connecting loop end prefetch data and loop start prefetch data continuously at the end of loop-type data.

A fourth aspect of the present invention inheres in a computer implemented prefetch instruction method including: setting a sum of a transfer data number and an incremental part of data transfer as a new transfer data number; setting a sum of a transfer address and an address of the incremental part of the data transfer as a new transfer address; judging whether the new transfer address is larger than a sum of a loop start address and loop end offset; judging whether a block size of block data is larger than the new transfer data number if the new transfer address is smaller than the sum of the loop start address and the loop end offset; deleting backward data overflowing from a loop end and storing remaining forward data in a buffer if the new transfer address is larger than the sum of the loop start address and the loop end offset; securing data represented by a value obtained by subtracting a remaining part of data transfer from the incremental part of the data transfer at a position of the loop start address and writing the data in a free space area of the buffer; and setting a sum of the new transfer address and an address corresponding to a value obtained by subtracting the remaining part of data transfer from the incremental part of the data transfer as a further new transfer address.

A fifth aspect of the present invention inheres in a computer program product for executing an application on a signal processor including: instructions configured to set a sum of a transfer data number and an incremental part of data transfer as a new transfer data number; instructions configured to set a sum of a transfer address and an address of the incremental part of the data transfer as a new transfer address; instructions configured to judge whether the new transfer address is larger than a sum of a loop start address and loop end offset; instructions configured to judge whether a block size is equal to the new transfer data number if the new transfer address is smaller than the sum of the loop start address and the loop end offset; instructions configured to delete backward data that has overflowed from a loop end and store remaining forward data in a buffer if the new transfer address is larger than the sum of the loop start address and the loop end offset; instructions configured to obtain data represented by a value obtained by subtracting a remaining part of data transfer from the incremental part of the data transfer at a position of the loop start address and write the data in a free space area of the buffer; and instructions configured to set a sum of the new transfer address and an address corresponding to a value obtained by subtracting the remaining part of data transfer from the incremental part of the data transfer as a further new transfer address.

BRIEF DESCRIPTION OF DRAWINGS

FIG. 8 is a constitutional example of an instruction format for use in the signal processor according to the embodiment of the present invention.

FIG. 13 is a flowchart (steps S10 to S20) illustrating the prefetch instruction method for the loop-type data structure in the signal processor according to the embodiment of the present invention.

DETAILED DESCRIPTION OF THE EMBODIMENT

Figure 1:
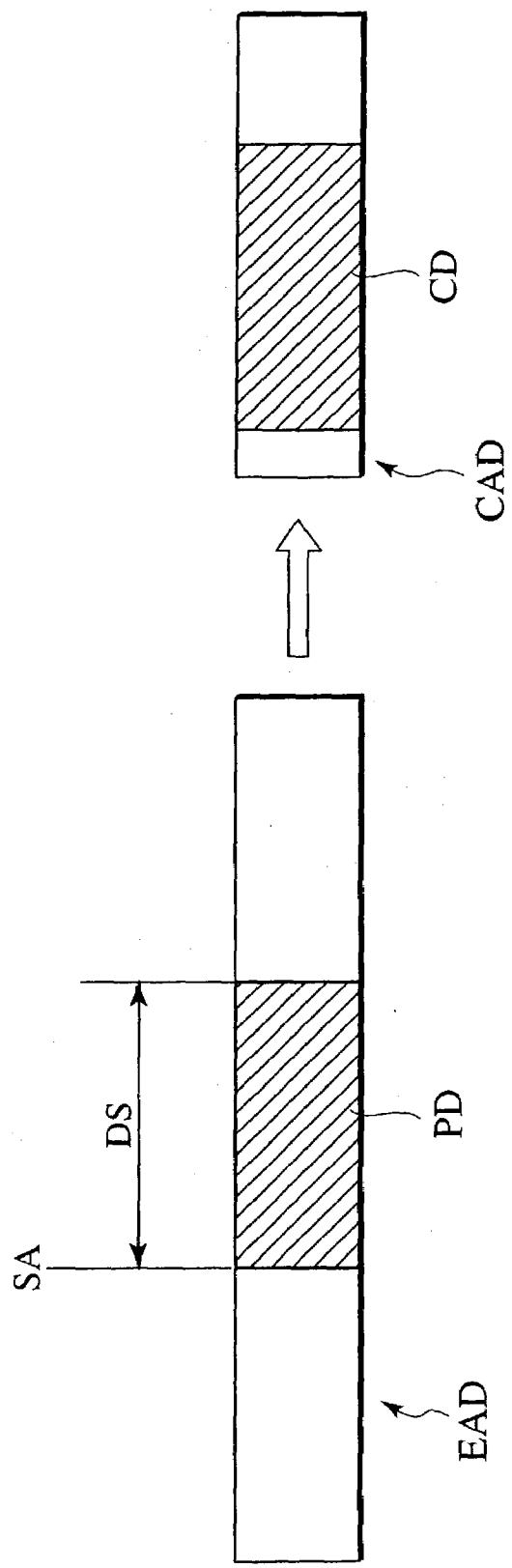
FIG. 1 is a comparative example of the present invention and a view illustrating a function of a general prefetch instruction to select prefetch data in address data on an external memory and transfer the prefetch data to a cache memory.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Generally and as it is conventional in the representation of the circuit blocks, it will be appreciated that the various drawings are not drawn to scale from one figure to another nor inside a given figure, and in particular that the circuit diagrams are arbitrarily drawn for facilitating the reading of the drawings.

In the following descriptions, numerous specific details are set forth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

COMPARATIVE EXAMPLE

First, a description will be made by use of a simple structure. In some cases, an external memory is connected to a processor and necessary data is read out from the external memory when needed to operate the processor. When reading out the data from the external memory, since the data is supplied from the external memory to a process execution block in the processor, there is a disadvantage that a lot of time is spent from start of access until arrival of data at the process execution block.

On the other hand, in an arrangement where a cache memory is included within the processor, data is supplied from the external memory to the cache memory. When reading out the data from the cache memory, less time is spent from start of access until arrival of data at the process execution block.

When the cache memory does not include desired data and the necessary data is read out from the external memory because the cache has a small memory capacity, it takes a large amount of time to transfer data from the external memory to the process execution block. Accordingly, there is a disadvantage that a lot of time is spent from start of access until arrival of data at the process execution block. Specifically, if the external memory storing necessary data is accessed to read out the necessary data when the data is actually needed, it takes a long time for the data to be read out from the external memory, so that there is a high likelihood of a slowdown of the processing.

Accordingly, a processor provided with a prefetch instruction function has an advantage that less time is spent from start of access until arrival of data at the process execution block. The prefetch instruction function is to previously register data with high usage frequency in the cache memory and to access the registered data.

Specifically, a prefetch instruction is incorporated in instructions of the processor, and software is designed to previously read out data necessary for processing in the cache memory mounted on the processor. It is efficient to previously fetch necessary data, especially in processing of multimedia data such as streaming video and audio. In other words, it is advantageous to issue prefetch data by the prefetch instruction before needed.

The existing microprocessor or the like processes multimedia data such as video and audio by implementing the above described two functions, that is, the high speed cache memory function and the function of reading out prefetch data by the prefetch instruction from the processor.

However, at the present time, the system of reading out data by the prefetch instruction can read out only row data in a direction that an address increases from a starting point of reading out until an end point of reading out.

Here, a function of a general prefetch instruction will be described. When prefetch data PD is selected in address data EAD on the external memory and transferred to the cache memory, as shown in FIG. 1, the prefetch data PD is selected by specifying a start address SA and a data size DS. The selected prefetch data PD is transferred to the cache memory, and a desired cache data CD can be obtained in addressed data CAD on the cache memory. Here, since the data size DS is specified from the start address SA in the address data EAD on the external memory, when data is read out with the prefetch instruction, only the data row in the direction (a right direction in FIG. 2) that increases the address can be read out.

Figure 2:
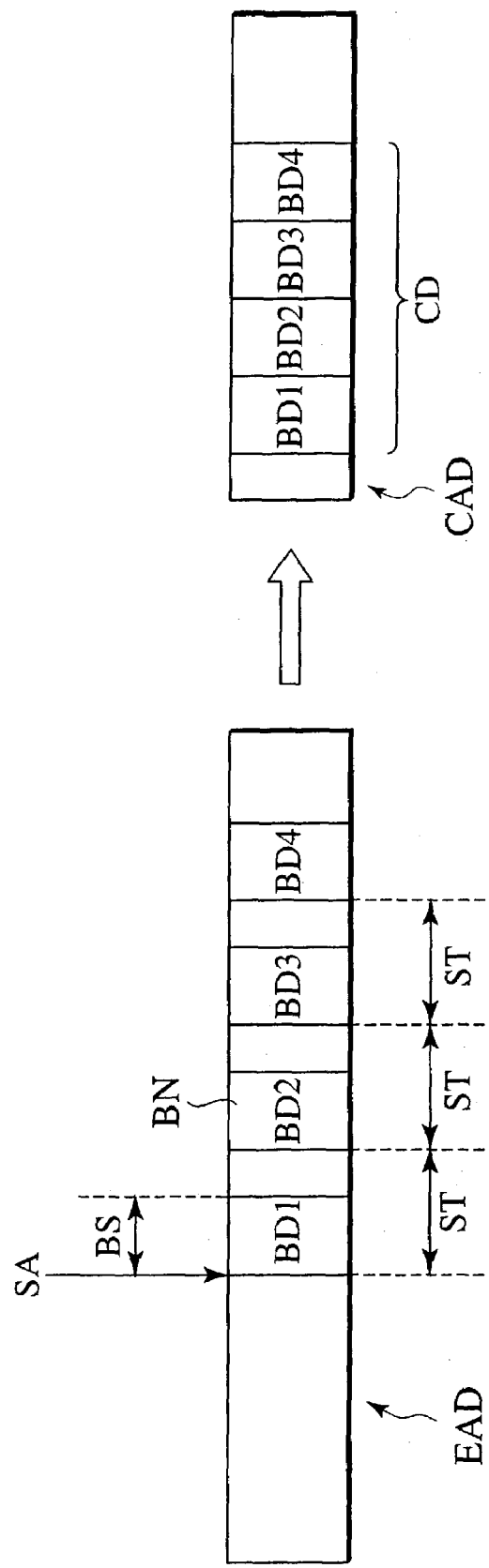
FIG. 2 is another comparative example of the present invention and a view illustrating a function of the general prefetch instruction to select prefetch data located at intervals in the address data on the external memory and transfer the prefetch data to the cache memory.

In some cases, data located at intervals on the external memory are collected in blocks and transferred to the cache memory. For example, in video data, color separation data of R (red), G (green) and B (blue) are individually collected and transferred to the cache memory as data of only R, only G and only B, respectively. In such a case of handling data located at intervals, as shown in FIG. 2 for example, block data BD1, BD2, BD3, and BD4 are located at discrete positions in the address data EAD on the external memory. When such address data EAD on the external memory is transferred to the address data CAD on the cache memory to obtain the cache data CD, the block data at discrete positions are collected and transferred in a compressed form to the cache memory. The data block BD1 is determined by a predetermined block size BS from the start address SA, and other block data BD2, BD3 and BD4 are similarly specified. The number of blocks is predetermined by a block number BN. The intervals between the start addresses of the respective block data are determined by a stride ST. In the example of FIG. 2, in reading out data with the prefetch instruction, even when discrete data from a starting point of reading out until an end point of reading out is read out in the address data EAD on the external memory, only the data row in a direction that increases the address can be read.

Figure 3:
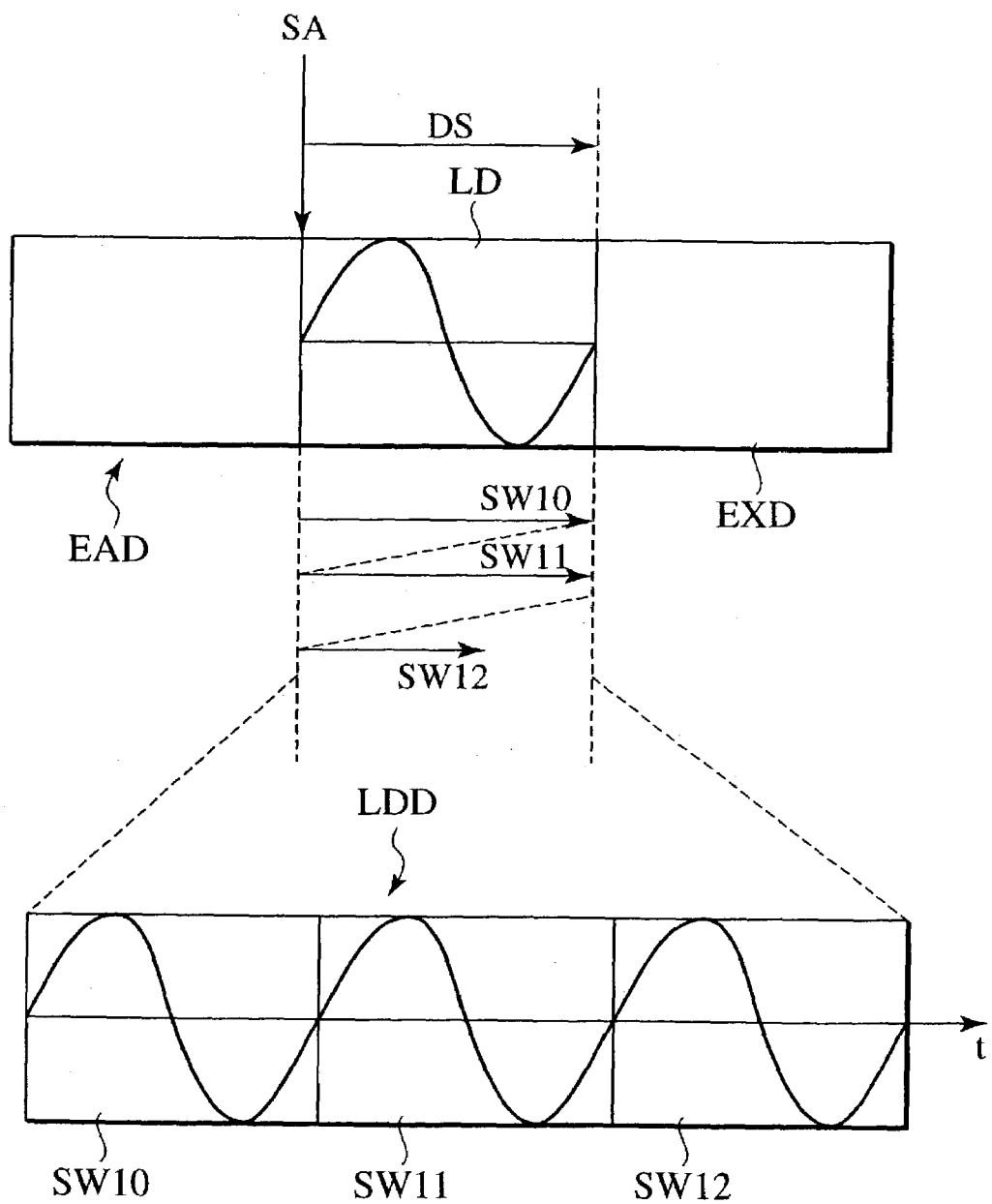
FIG. 3 is another comparative example of the present invention and a view illustrating a function of the general prefetch instruction to repeatedly select loop data in the addressed data on the external memory and transfer the loop data to the cache memory.

In streaming technology utilized in so-called video delivery or the like from the Internet, the prefetch instruction as described above is adequate for data processing of audio and video data. However, in audio and/or sound synthesis processing in which a loop is repeatedly executed several times to read out data, software needs to consistently perform decision process whether or not the read-out address reaches the end point of a loop. Specifically, as shown in FIG. 3, when loop data LD within the data size DS from the start address SA is repeatedly read out to the address data EAD on the external memory, desired loop data LDD can be read out in a smooth continuous form by repeatedly scanning the range of the data size DS several times, as shown by SW10, SW11, SW12 .... Accordingly, in voice synthesis processing in which the loop is repeatedly executed several times to read out data, the software needs to consistently perform the judging process of whether or not the read-out address reaches the end point of the loop. Thus, the software experiences substantial difficulties.

Furthermore, when it is judged that the read-out address has reached the end point of the loop, an instruction needs to be reissued so as to prefetch a desired amount of data from the start point of the loop. The example of FIG. 3 corresponds to a case of reproducing a voice "po" as audio data several times. The loop data LD within the size DS from the start address SA is read out three times over the repeatedly read-out sizes SW10, SW11 and SW12. In this case, there is a possibility that excluded data EXD may be read out. FIG. 3 shows a continuous waveform (abscissa: time) of the desired loop data LDD when the voice "po" is reproduced three times. As previously described, in the voice synthesis processing in which the loop is repeatedly executed several times to read out data, the software needs to consistently perform the judging process of whether or not the read-out address reaches the end point of the loop, and so the software experiences substantial difficulties.

Even in such a case, when processing large size data so that the read-out address takes time to reach the end of the loop, the judging process and correspondence process do not impose a substantial burden the software. However, when handling a plurality (several tens to several hundreds) of sounds such as a sound of a short period waveform having a data size referred to as a phoneme and which requires loop processing like an electronic musical instrument; and a sound obtained by sampling a long term sound like streaming, the total number of processes such as the above-described judgment processes and correspondence processes becomes enormous.

(Embodiment)

Next, an embodiment of the present invention will be described with reference to the drawings. In the following drawings, the same or similar parts are given the same or similar reference numerals and symbols. The embodiment shown in the followings exemplifies an apparatus or a method for embodying technical ideas of the present invention. The technical ideas are not intended to limit structures, arrangements or the like of components to those to be described below. Various modifications can be added to the technical ideas of the present invention within the scope of the appended claims.

In the embodiment of the present invention to be described below, a description will be made of a signal processor capable of previously reading out and storing data as a "continuous data row" to the cache memory by use of a prefetch instruction including a parameter for determining a start point and an end point of the data of a memory storing the data. Furthermore, a description will be made of a prefetch instruction method and a prefetch instruction program for use in the signal processor including a prefetch instruction function for a loop-type data structure.

Figure 4:
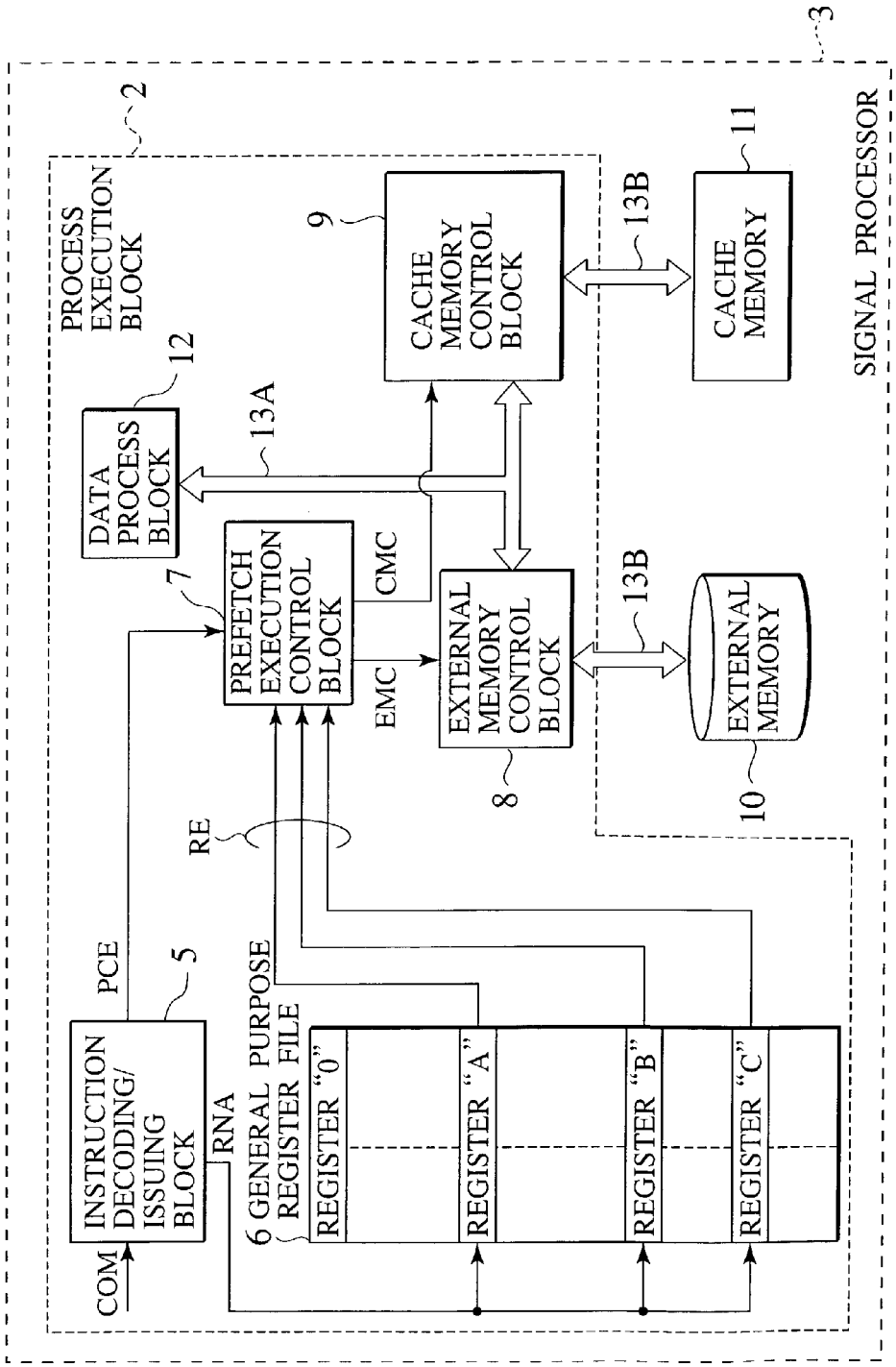
FIG. 4 is a constitutional block diagram showing in detail a signal processor according to an embodiment of the present invention.

As shown in FIG. 4, a signal processor 3 according to an embodiment of the present invention includes an external memory 10, a cache memory 11, an instruction decoding/issuing block 5, a general purpose register (also dedicated register is appliable) file 6, a prefetch execution control block 7, an external memory control block 8, a cache memory control block 9, and a data processing block 12. The instruction decoding/issuing block 5 receives an execution command COM from a processor 1. The general purpose register file 6 receives in registers A, B and C a register number specifying signal RNA from the instruction decoding/issuing block 5. The prefetch execution control block 7 receives register content output data RE from the general purpose register file 6 and also a prefetch instruction execution signal PCE from the instruction decoding/issuing block 5. The cache memory control block 9 receives a cache memory control instruction signal CMC from the prefetch execution control block 7 and transmits/receives data to/from the cache memory 11 through a data bus 13B. The external memory control block 8 receives an external memory control instruction signal EMC from the prefetch execution control block 7 and transmits/receives data to/from the external memory 10 through the data bus 13B. The data process block 12 transmits/receives data to/from the external memory control block 8 and the cache memory control block 9 through a data bus 13A. Here, the external memory control instruction signal EMC can be considered to contain information substantially the same as the external memory access address information shown in FIG. 10 to be described later. However, as shown in FIG. 4, since the external memory control instruction signal EMC is a signal between the prefetch execution control block 7 and the external memory control block 8, the external memory control instruction signal EMC contains other information in addition to the address information.

Figure 5:
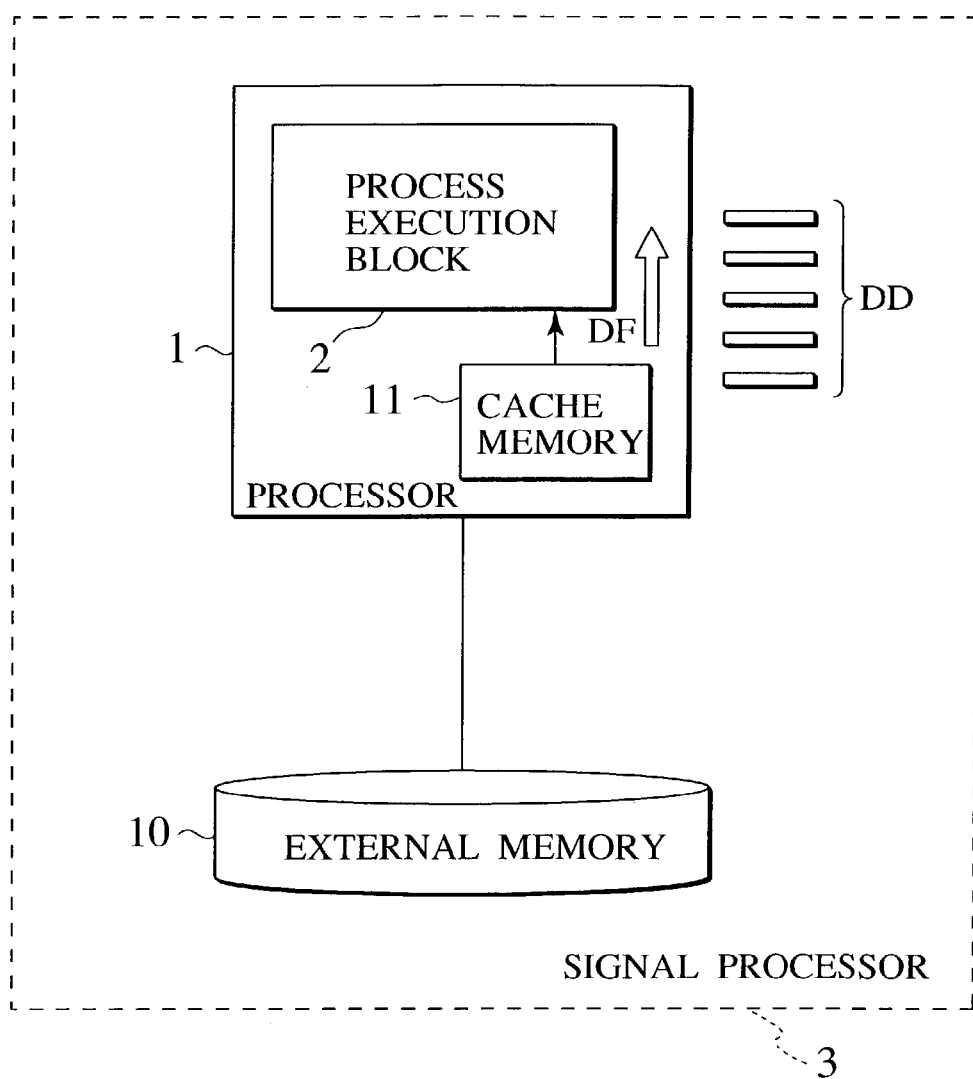
FIG. 5 is a constitutional block diagram schematically showing the signal processor according to the embodiment of the present invention.

As schematically shown in FIG. 5, the signal processor 3 according to an embodiment of the present invention includes a process execution block 2 and the cache memory 11 and has a prefetch instruction function for the loop type data structure. In relation to FIG. 4, the external memory 10 and the cache memory 11 in FIG. 4 correspond to the external memory 10 and the cache memory 11 in FIG. 5, respectively. The process execution block 2 includes all of the components in FIG. 4 except the external memory 10 and the cache memory 11. Specifically, the process execution block 2 includes the instruction decoding/issuing block 5, the general purpose register file 6, the prefetch execution control block 7, the external memory control block 8, the cache memory control block 9, and the data process block 12 in FIG. 4. The processor 1 includes the process execution block 2 and the cache memory 11.

When executing an instruction within the processor 1, a type of execution instruction COM to be executed from the processor 1 is judged in the instruction decoding/issuing block 5. Depending on a result, the prefetch instruction execution signal PCE is issued from the instruction decoding/issuing block 5 to the prefetch execution control block 7, and the register number specifying signal RNA is issued to the general purpose register file 6. A decoding block and an issuing block are illustrated as one block for the instruction decoding/issuing block 5 in FIG. 4, but the decoding block and the issuing block may be illustrated as separate blocks. If the execution instruction COM is a "prefetch instruction", at a step of issuing an instruction, register specifying information including the register number specifying signal RNA, which is included in the prefetch instruction, is transmitted to the general purpose register (dedicated register) file 6, and a register is selected in accordance with the register specifying information of the register number specifying signal RNA. Information stored in the selected register is transmitted to the prefetch execution control block 7 as the register content output data RE. Herein, the register specifying information including the register number specifying signal RNA is to specify, from the general-purpose register file 6, a register to be used in the instruction, or to specify a dedicated register originally provided in the processor to carry out the present invention. Alternatively, the register specifying information may specify a register from a combination of the above described two types of registers.

Although, three registers A, B and C are selected and the register content output data RE are outputted therefrom in FIG. 4, the number of registers is not particularly limited to three. More registers may be selected as long as necessary information for carrying out the present invention can be obtained. Basically, since the necessary number of registers is determined by architecture (basic structure) of the processor, the number of selected registers is determined depending on the architecture.

When the instruction is identified as the "prefetch instruction" in the instruction decoding/issuing block 5 and the prefetch instruction execution signal PCE is issued and transferred to the prefetch execution control block 7 to execute the "prefetch instructions", the prefetch execution control block 7 starts a prefetch operation in accordance with the register content output data RE based on the content of the above mentioned registers.

In accordance with the register content output data RE, the prefetch execution control block 7 calculates and generates an address where the data is read out from the external memory 10, while judging whether or not the data to be prefetched reaches an end address of a loop. The generated address is transmitted to the external memory control block 8 as the external memory control instruction signal EMC.

At the same time as the above described operation, the cache memory control instruction signal CMC is transmitted to the cache memory control block 9, and external memory control and cache memory control involved in prefetch are executed.

As shown in FIG. 4, the data bus 13A is connected between the data processing block 12, the external memory control block 8, and the cache memory control block 9. The data bus 13B is connected between the external memory 10 and the external memory control block 8 as well as between the cache memory 11 and the cache memory control block 9. Since data stored in the cache memory 11 is used in the data process block 12 afterwards, the data read out by means of prefetch is stored in the cache memory 11 from the external memory 10 through the data buses 13A and 13B.

The cache memory 11 can deal with the prefetch instruction for the loop-type data structure. A prefetch instruction function program provided with access by a circulating address enables a loop-type data execution process. The cache memory 11 can operate at high speed but has a small memory capacity. Accordingly, memory contents thereof need to be updated. Therefore, the external memory 10 having a large capacity is essential. FIG. 5 schematically illustrates a flow DF of data DD from the cache memory 11 to the process execution block 2. In the present invention, the data can be previously read out and stored to the cache memory 11 as the "continuous data row" accompanied by a parameter capable of determining the start and end points of the data of the cache memory 11 previously storing the data, where the software does not require the judgment process and the correspondence process at the end point of the loop. In other words, the present invention can be operated with the prefetch instruction.

According to the processor 1 constituting the signal processor 3 of the present invention, by being provided with the prefetch instruction function for the loop-type data structure, the problem of an enormous total number of processes such as the judgement processes and the correspondence processes can be adequately dealt with, when handling several tens to several hundreds of sounds such as a sound of a short period waveform having a data size called a phoneme and which requires loop processing like an electronic musical instrument, and a sound obtained by sampling a long term sound such as streaming. In such a case, when processing large size data that requires time to reach the end of the loop, the judgment process and the correspondence process do not impose a substantial burden the software.

Figure 6:
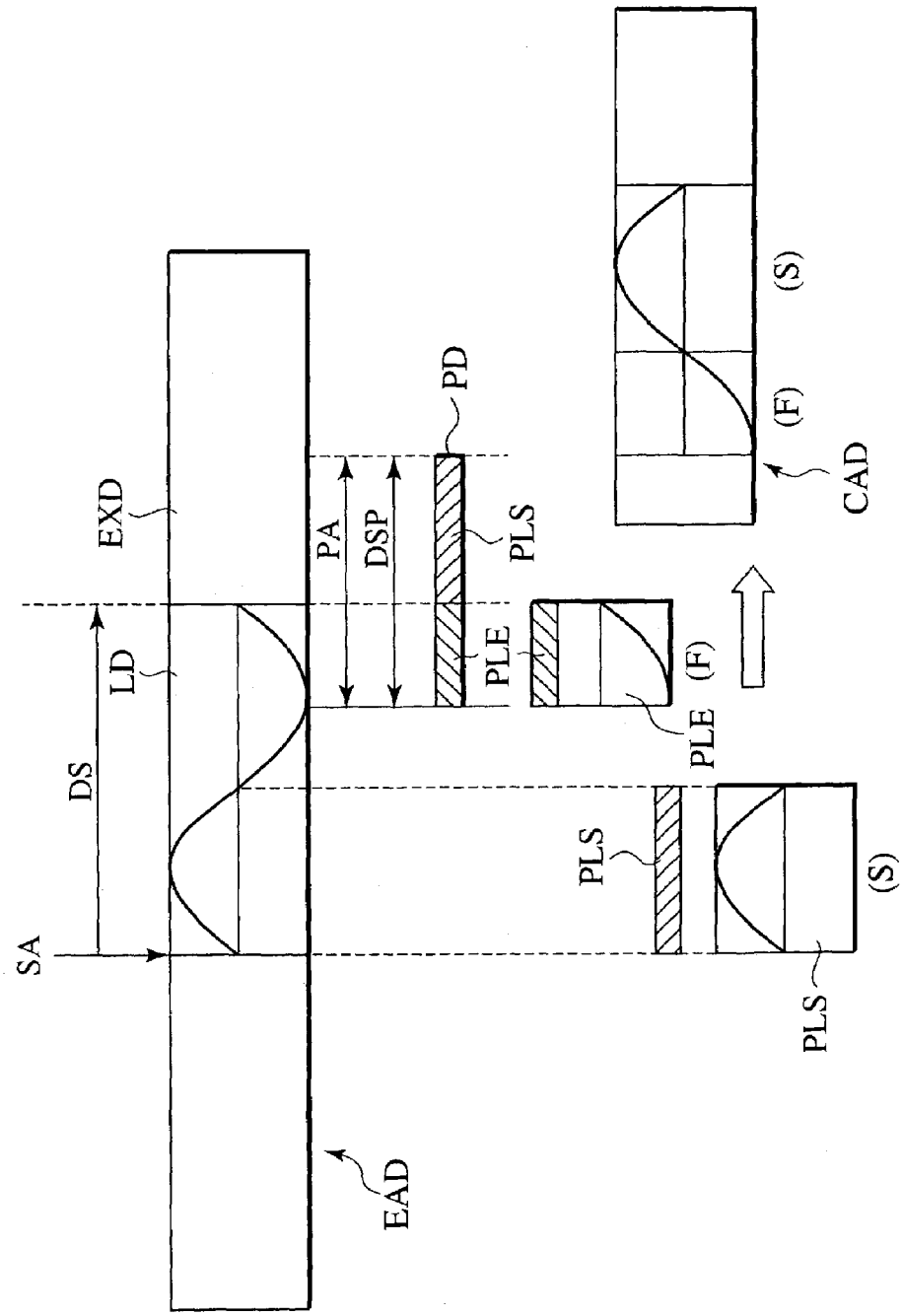
FIG. 6 is a comparative example of the present invention in a case of using general prefetch and a constitutional view illustrating a method of intentionally stopping prefetch at an end of a loop, and issuing prefetch from a start point, and transferring data to the cache memory.

In the case of general prefetch, when the prefetch crosses over the end of a loop data LD, as shown in the comparative example in FIG. 6, in a first step (F), the prefetch is intentionally stopped at the end, and prefetch from the end is issued. Specifically, in the address data EAD on the external memory, a prefetch area PA and a data size DSP of the prefetch area PA are defined at the end portion of the loop data LD having a data size DS from the start address SA. When the loop data LD is read out over the data size DS, prefetch is intentionally stopped at the end, and then prefetch from the end is issued, thus creating an address data CAD on the cache memory. In the vicinity of the prefetch area PA, since prefetch is intentionally stopped at the end, data to the end is read out of the data size DSP in the prefetch area PA. The data transferred at this time is loop end prefetch data PLE of the prefetch data PD.

Next, in a second step (S), loop start prefetch data PLS of the prefetch data PD is transferred. After the first step (F), prefetch from the start point is issued so that continuous data is obtained. Specifically, prefetch is intentionally stopped at the end of the loop to form data as if the data is continuous. In FIG. 6, PLE means the loop end prefetch data, and PLS means the loop start prefetch data. The address data CAD on the cache memory is obtained by a combination of the loop end prefetch data PLE and the loop start prefetch data PLS. However, an excluded data EXD is sometimes read out in the address data EAD on the external memory. Moreover, for example, when the read-out address reaches the end of the loop while reading out the data, the software needs to recognize that the read-out address reaches the end of the loop and returns to the start point to read out the data again, thus the operation is complex.

As described above, the loop end prefetch data PLE as data up to the end is transferred in the first step (F), and the loop start prefetch data PLS as data of the remaining part is transferred again in the second step (S).

Figure 7:
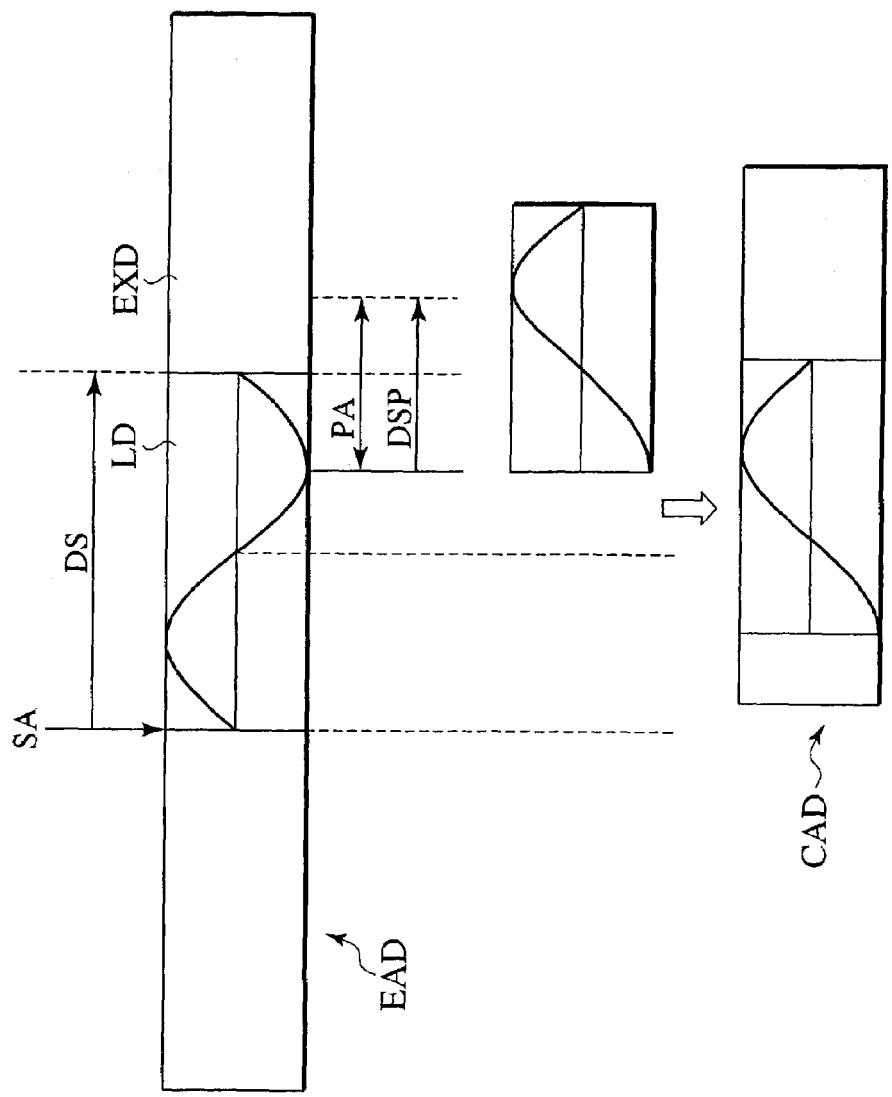
FIG. 7 is a constitutional view illustrating a method of automatically returning to the start point to prefetch data on reaching the end of the loop and transferring the data to the cache memory in the signal processor according to the embodiment of the present invention.

As shown in FIG. 7, as for such handling of general loop data, the signal processor 3 according to an embodiment of the present invention is characterized by using prefetch, when the read-out address reaches the end of the loop, the read-out address is automatically returned to the start point and prefetch is executed. In the case of reading out the loop data LD having a predetermined data size DS from the start address SA, when the read-out address reaches the end of the prefetch area PA, the read-out address is automatically returned to the start point and prefetch is executed. Accordingly, the excluded data EXD is not read out, and the data can be continuously read out in a very seamless manner. In other words, the data as continuous data can be received without the software being configured to determine whether or not the read-out address reaches the end of the loop.

Next, a description will be made of an example of an instruction format of the execution instruction COM from the processor 1 shown in FIG. 4.

Figure 8:
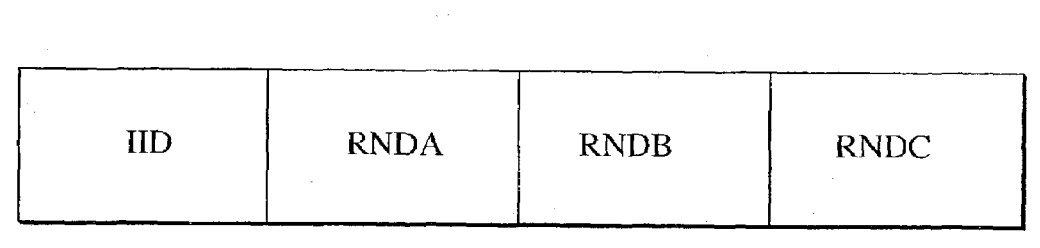

In order to carry out the present invention, an area or the like for specifying the register numbers is necessary to the execution instruction from the processor 1. As shown in FIG. 8, a combination of an instruction identifier IID, a register number identifier A RNDA, a register number identifier B RNDB, and a register number identifier C RNDC constitutes the example of an instruction format ICOM for providing the instruction. In the processor, all the instruction formats generally have the same bit length and include the "instruction identifier" indicating a content of the instruction. In the processor according to an embodiment of the present invention, the instruction identifier IID is assigned a value specific to the "prefetch instruction" for data of the loop-type data structure. The instruction identifier IID is followed by information of the three registers, the register number identifier A RNDA, the register number identifier B RNDB, and the register number identifier C RNDC. The general purpose registers (dedicated registers) specified by these identifiers store information necessary for executing the prefetch instruction.

In the signal processor 3 according to an embodiment of the present invention, as shown in FIG. 4, the three registers are specified as an example necessary for executing the prefetch instruction. However, the number of identifiers may be one if necessary information can be obtained.

Next, a description will be made of contents of data of the general purpose register (dedicated register) file 6 necessary for execution of the prefetch instruction.

Figure 9:
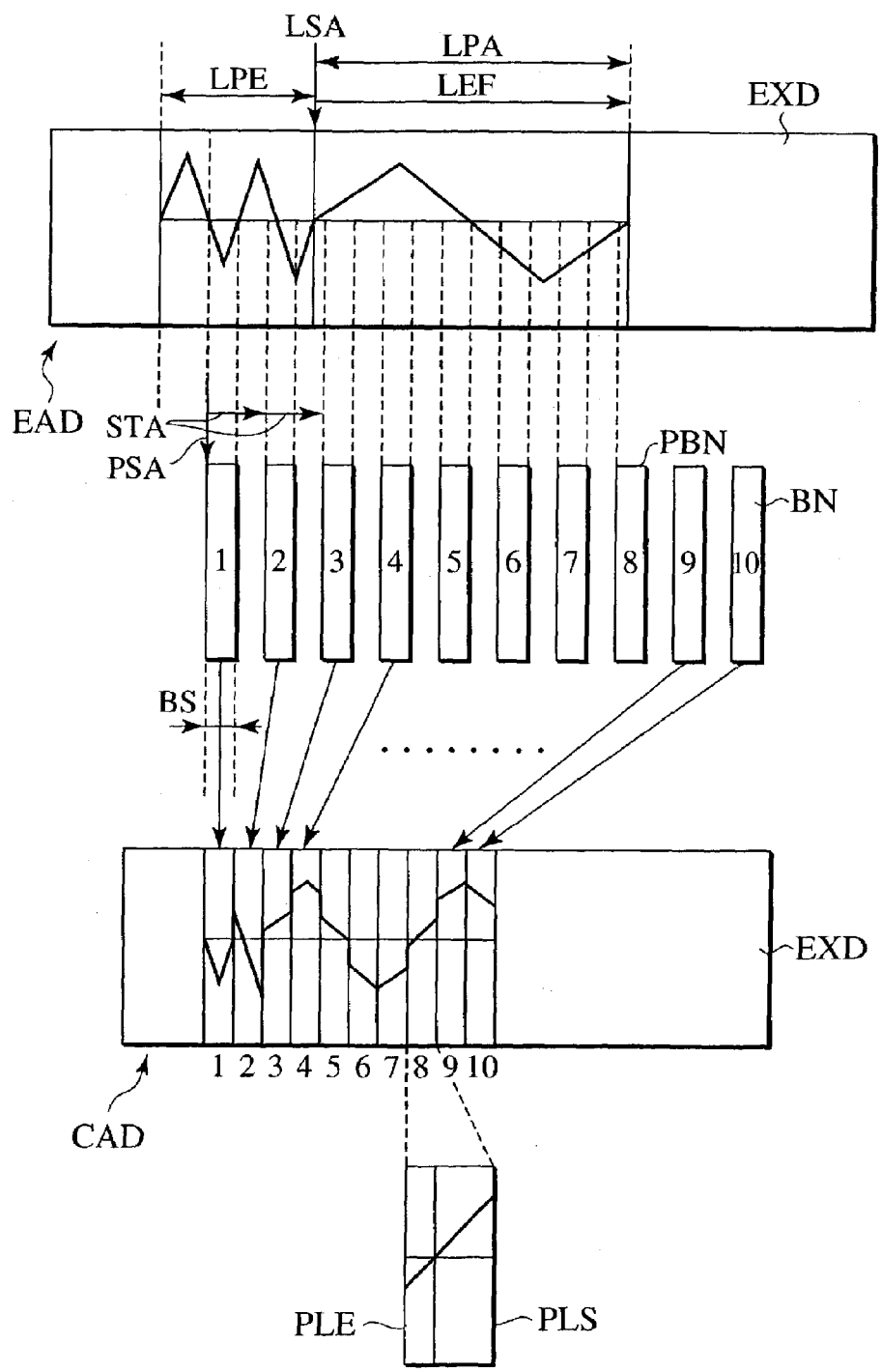
FIG. 9 is an operation explanatory view illustrating a method of storing data located at intervals on the external memory onto the cache memory in the signal processor according to the embodiment of the present invention.

As shown in FIG. 9, in an example of information stored in the general purpose register (dedicated register) file 6, there are six types of information, which are a loop start address LSA, a loop end offset LEF, a prefetch start address PSA, a stride address STA, a block size BS, and a prefetch block number PBN.

Next, these six types of information will be described.

The "loop start address LSA" is a parameter specifying a loop part lead address, where loop prefetch is executed. The loop start address LSA is specified as an absolute address.

The "loop end offset LEF" is a parameter for specifying an address of an end of the loop part where the loop prefetch is executed. The loop end offset LEF is represented by a difference from the loop start address LSA in order to economize the amount of data. The loop end offset LEF is specified as a relative address. The loop end offset LEF is determined as follows. Specifically, the loop end offset LEF is previously defined by an user. Accordingly, the loop end offset LEF has a fixed value from the beginning.

The "prefetch start address PSA" is a parameter specifying an address where prefetch is started. The prefetch start address PSA is specified as an absolute address.

The "stride address STA", which is used in existing technology, is a parameter used for prefetch of block data located at intervals. The stride address STA indicates a difference between lead addresses of blocks, each of which is a block of continuous data. The stride address STA is determined by a program.

The "block size BS" is a parameter specifying an amount of data of each block of continuous data as described in the stride address STA.

The "prefetch block number PBN" is a parameter specifying the number of blocks to be prefetched by the prefetch instruction.

Usage of each type of information will be described with reference to FIG. 9. In FIG. 9, prefetch is started by specifying the prefetch start address PSA as the start address of prefetch in a loop prefetch not-applied area LPE, which is defined by the loop start address LSA and the loop end offset LEF. Specifically, as shown in FIG. 9, a loop prefetch applied area LPA is determined in the address data EAD on the external memory by the loop start address LSA and the loop end offset LEF. The part other than the loop prefetch applied area LPA and the loop prefetch not-applied area LPE is the excluded data EXD. The area before the loop start address LSA is the loop prefetch not-applied area LPE as shown in FIG. 9. In this case, similar to the usual prefetch, data is read out at intervals from the external memory 10 by a block size BS in accordance with the block size BS, the stride address STA, and the prefetch block number PBN.

As shown in FIG. 9, reading out is similarly performed also in the loop prefetch applied area LPA. When the read-out address reaches the end of the loop (right end defined by the loop end offset LEF in the loop prefetch applied area LPA in FIG. 9), the read-out address is returned to the address specified by the loop start address LSA, and data of a size equal to the remaining part of the block size BS is read out. As shown in FIG. 9, the address data CAD on the cache memory 11, that is, cache entry is formed by compressing and collecting block data read out at intervals. Thus a storage state in the cache memory 11 can be schematically understood. More specifically, in FIG. 9, PLE indicates a prefetch data associated with loop end prefetch, and PLS indicates a prefetch data associated with loop start prefetch. Referring to a detailed enlarged view of a block 8 shown at the bottom, data in the loop end prefetch data PLE is data prefetched up to the end of the loop. Data in the loop start prefetch data PLS is data of a size equal to the remaining part of the block prefetched after returning to the start of the loop.

After reading out the data of the prefetch block number PBN, all the read out data is stored on the cache memory 11 and the executed prefetch instruction is finished. Here, the data may be stored in the cache memory 11 each time the data is read out from the external memory 10.

Next, a description will be made of the prefetch execution control block (hardware) 7, which is important for executing the prefetch instruction.

The prefetch execution control block 7 operates when the prefetch execution control block 7 receives the aforementioned information, namely, the loop start address LSA, the loop end offset LEF, the prefetch start address PSA, the stride address STA, the block size BS, and the prefetch block number PBN and also when the present prefetch instruction is executed. Specifically, the prefetch execution control block 7 starts to operate on receiving a prefetch instruction execution signal PCE from the instruction decoding/issuing block 5 shown in FIG. 4 and checking that the execution instruction COM from the processor 1 is the prefetch instruction.

Figure 10:
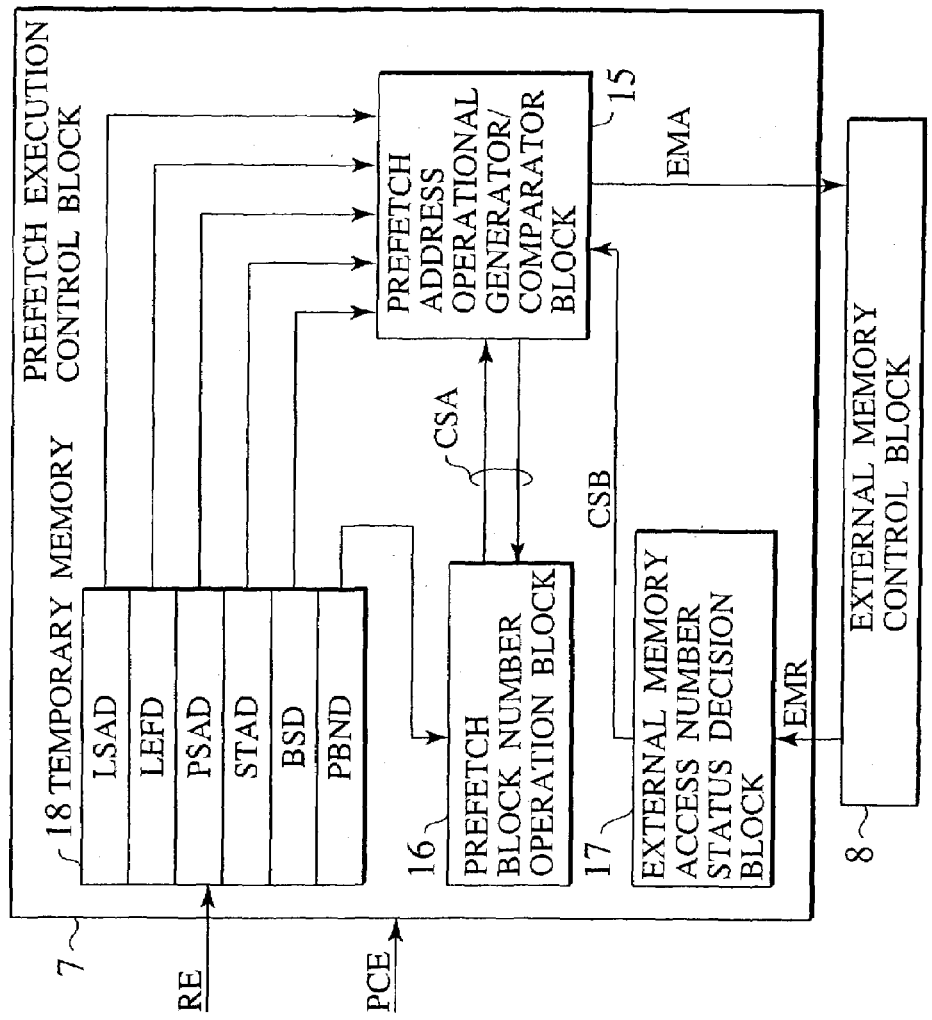
FIG. 10 is a block diagram illustrating a prefetch execution control block in the signal processor according to the embodiment of the present invention.

As shown in FIG. 10, the register content output data RE provided from the general purpose register file 6 is transmitted to the prefetch execution control block 7 as information of various types necessary for the present prefetch instruction. These various types of information are stored in a temporary memory (memory register) 18 in the prefetch execution control block 7 and retained until the present prefetch instruction is completed. In the prefetch execution control block 7, as shown in FIG. 10, six types of information are stored in the temporary memory 18 as loop start address data LSAD, loop end offset data LEFD, prefetch start address data PSAD, stride address data STAD, block size data BSD, and prefetch block number data PBND. The information of the loop start address data LSAD, loop end offset data LEFD, prefetch start address data PSAD, stride address data STAD, block size data BSD, and prefetch block number data PBND is transmitted to a prefetch address operational generator/comparator block 15 to generate concrete information of an address to access the external memory 10.

In the prefetch address operational generator/comparator block 15, external memory access address information EMA is generated based on inputted information. Simultaneously, a comparison is made as to whether or not the generated external memory access address information EMA exceeds the end of the loop, which is obtained by adding the loop end offset data LEFD and the loop start address data LSAD. The information of the prefetch block number data PBND is transmitted to a prefetch block number operation block 16. The prefetch block number operation block 16 manages the degree of advance of the prefetch block number data PBND, which is required to be counted in accessing the external memory 10. In order to properly generate the address, the prefetch address operational generator/comparator 15 and the prefetch block number operation block 16 manage states thereof with each other by use of a control signal CSA therebetween. The address associated with the external memory access address information EMA generated by an operation for the block data in the prefetch address operational generator/comparator 15 is transmitted to the external memory control block 8.

As shown in FIG. 4, the external memory control block 8 accesses the external memory 10 based on the address associated with the external memory access address information EMA. In order to reflect access status to the external memory 10, the access status is transmitted from the external memory control block 8 to an external memory access number status decision block 17. The access status is information for determining whether or not access to the desired number of addresses is finished. The information is referred to as an external memory control instruction response signal EMR. The access status needs to be successively reflected to the external memory because the external memory control block 8 can not be continuously occupied by the present prefetch instruction from the start of access to the external memory 10 until the end of the access.

The first reason for the above-described process is that access to the external memory control block 8 is executed in a descending order of priority in consideration of the priorities of other access generated at the same time. Because of a comparatively low priority, memory access by prefetch is executed when no other access is executed. Accordingly, execution of the memory access by the prefetch is divided into several steps, and the memory access by the prefetch is executed while observing the access status of the external memory control block 8. The second reason is that an amount of data accessible by one access process to the external memory 10 is limited. Access to the external memory 10 is usually executed by an unit of a certain defined amount of data. The amount of defined data depends on a cache line size of the cache memory 11 as a copy source or destination of the external memory 10. If the cache line size of the cache memory 11 is 32 bytes, the amount of data transferred for one access to the external memory 10 is 32 bytes.

The external memory access number status decision block 17 monitors the status of the external memory control unit 8 (the status concerning prefetch gradually executed for the above described reasons). The external memory access number status decision block 17 then transmits the information thus obtained, such as information that "the external memory control block 8 is available " or an advancement state such as "which data has been accessed", to the prefetch address operational generator/comparator block 15 through a control signal CSB. Thus, the prefetch address operational generator/comparator block 15 is controlled. Furthermore, the external memory access number status decision block 17 controls the prefetch block number operation block 16 through a control signal CSA.

Figure 11:
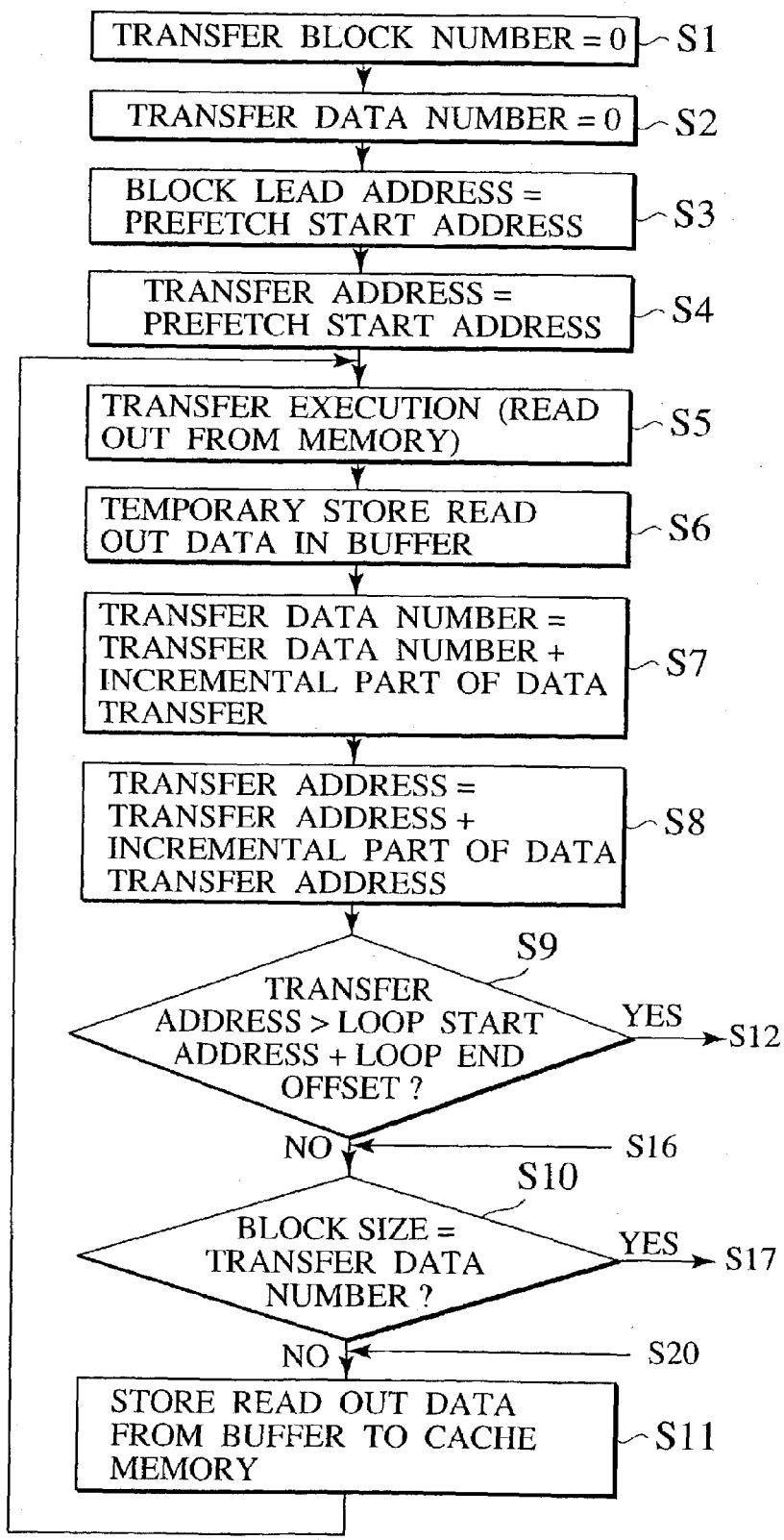
FIG. 11 is a flowchart (steps S1 to S11) illustrating a prefetch instruction method for a loop-type data structure in the signal processor according to the embodiment of the present invention.
Figure 12:
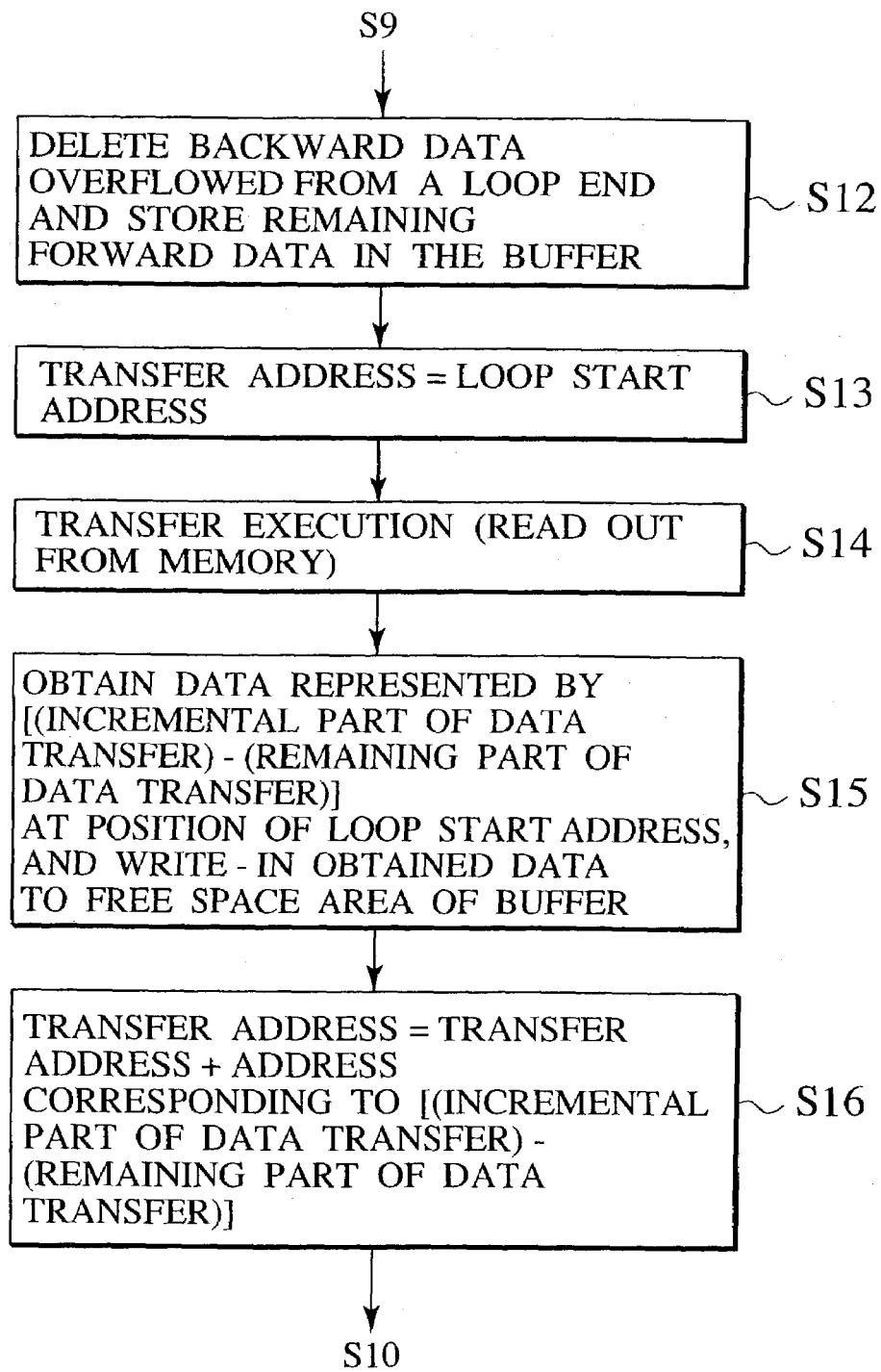
FIG. 12 is a flowchart (steps S9 to S16) illustrating the prefetch instruction method for the loop-type data structure in the signal processor according to the embodiment of the present invention.

An operation flowchart of the prefetch instruction method of the processor having the prefetch instruction function for the loop-type data structure includes combinations of steps S1 to S11 shown in FIG. 11, steps S12 to S16 shown in FIG. 12, and steps S17 to S20 shown in FIG. 13.

(a) In step S1, a transfer block number is set to 0. Next, in step S2, a transfer data number is set to 0. In step S3, a block lead address is set equal to the prefetch start address PSA. In step S4, a transfer address is set equal to the prefetch start address PSA. In such a state, transfer is executed in step S5. In other words, data is read out from the external memory 10. Next, in step S6, the read-out data is temporarily stored in a buffer. In step S7, a sum of the transfer data number and incremental part of the data transfer is set as a new transfer data number. Furthermore, in step S8, a sum of the transfer address and incremental part of data transfer address is set as a new transfer address.

(b) In step S9, it is judged whether or not the new transfer address is larger than a sum of the loop start address LSA and the loop end offset LEF.

(c) If a result of step S9 is yes, the procedure proceeds to step S12 (FIG. 12). If the result of step S9 is no, the procedure proceeds to step S10, and it is judged whether or not the new transfer data number is equal to the block size BS.

(d) If a result of step S10 is yes, the procedure proceeds to step S17 (FIG. 13). If the result of step S10 is no, the procedure proceeds to step S11. In step S11, the read out data is stored in the cache from the buffer. The procedure then returns to step S5.

(e) In step S12, backward data that has overflowed from a loop end is deleted, and remaining forward data is stored in the buffer. Herein, the new transfer data number is set as follows:

$$A = B + \Delta RD \quad (1)$$

where A is "the new transfer data number", B is "the transfer data number", and ΔRD is "remaining part of the data transfer".

(f) In step S13, the transfer address is set equal to the loop start address LSA. In such a state, transfer is executed in step S14. In other words, data is read out from the external memory 10.

(g) In step S15, when data of a size represented by (ΔD−ΔRD) is obtained at the position of the loop start address LSA, the data is written into a free space area of the buffer. Here, ΔD is the incremental part of the data transfer. The new transfer data number is set as follows:

$$A = B + \Delta RD + (\Delta D - \Delta RD) = B + \Delta D \quad (2)$$

(h) Accordingly, adjustment of the transfer data number is performed between step S12 and step S15.

(i) In step S16, a sum of the transfer address and an address corresponding to (ΔD−ΔRD) is set as a new transfer address. The procedure then proceeds to step S10 (FIG. 11). In step S10, it is judged whether or not the new transfer data number is equal to the block size BS. If the result is yes, the procedure proceeds to step S17 (FIG. 13). If the result is no, the procedure proceeds to step S1.

(j) In step S17, a value obtained by adding 1 to a transfer block number is set as a new transfer block number. In step S18, it is judged whether or not the prefetch block number PBN is equal to the new transfer block number. If the result is yes, the procedure proceeds to step S19, and prefetch transfer is finished. If the result is no, in step S20, a sum of the transfer address and a difference (stride address STA−block size BS) is set as a block lead address. The procedure then proceeds to step S11 (FIG. 11). After step S11, the procedure returns to step S5. The flowchart continues the procedure until a final judgment in step S9 is no, a judgment in step S10 is yes, and a judgment in step S18 is yes in order to finish the prefetch transfer.

It is obvious that the flowchart described in the embodiment of the present invention can be applied to execution of a program. Furthermore, it is obvious that a medium storing such a program can be provided.

(Other Embodiments)

As described above, the present invention has been described with reference to an embodiment of the invention. However, it should not be understood that the description and the drawings as part of the present disclosure may limit the present invention.

Various alternative embodiments, examples, and operational techniques will be apparent to those skilled in the art from the present disclosure. Accordingly, the technical scope of the present invention is determined by only the invention specific matter according to the appended claims valid based on the above description.

According to the signal processor of the present invention, among data located in a memory, data used in a looping manner can be automatically prefetched to a cache as seamless data, thus facilitating data processing. Consequently, software performance can be improved.

Furthermore, according to the prefetch instruction method and the prefetch instruction program of the present invention, the problem of an enormous total number of processes such as the judgment process or the correspondence process can be dealt with, thus improving the performance of the signal processor. Various modifications will become possible for those skilled in the art after receiving the teachings of the present disclosure without departing from the scope thereof.

As described above, it is obvious that the present invention includes various examples or the like which are not described herein. Accordingly, the technical scope of the present invention is determined by the appended claims valid based on the above description.

What is claimed is:

1. A signal processor comprising:

a processor having a cache memory and a process execution unit executing a process by use of information temporarily stored in the cache memory; and an external memory provided external to the processor, wherein the process execution unit automatically returns to a start point of loop-type data at an end of the loop-type data and sequentially reads out the loop-type data from the external memory to the cache memory and the process execution unit comprises:

an instruction decoding/issuing unit configured to receive an execution instruction;

a register file configured to receive a register number specifying a signal from the instruction decoding/issuing unit;

a prefetch execution control unit configured to receive a prefetch instruction execution signal from the instruction decoding/issuing unit and register content output data from the register file;

an external memory control unit configured to receive an external memory control instruction signal from the prefetch execution control unit;

a cache memory control unit configured to receive a cache memory control instruction signal from the prefetch execution control unit; and a data process unit coupled to the external memory control unit and to the cache memory control unit, and the prefetch execution control unit comprises:

a temporary memory configured to receive the register content output data from the register file;

a prefetch address operational generator/comparator unit which receives data from the temporary memory;

a prefetch block number operation unit configured to receive prefetch block number data different from the data from the temporary memory and transmits/receives a first control signal to/from the prefetch address operational generator/comparator unit; and an external memory access number status decision unit configured to receive an external memory control instruction response signal from the external memory control unit receiving external memory access address information transmitted from the prefetch address operational generator/comparator unit, and transmits a second control signal to the prefetch address operational generator/comparator unit.

2. The signal processor of claim 1, wherein the temporary memory unit comprises:

a loop start address data area storing loop start address data;

a loop end offset data area storing loop end offset data;

a prefetch start address data area storing prefetch start address data;

a stride address data area storing stride address data;

a block size data area storing block size data; and a prefetch block number data area storing prefetch block number data.

3. A computer implemented prefetch instruction method comprising:
  determining a loop start address and a loop end offset so as to assign a loop prefetch applied area, a loop prefetch not-applied area, and excluded data area in address data area in an external memory;
  specifying a prefetch start address in the loop prefetch not-applied area;
  reading out discrete block data by a block size in the loop prefetch not-applied area, by specifying a predetermined stride address from the prefetch start address;
  automatically returning to the loop start address on reaching an end of the loop prefetch applied area; and
  connecting the loop end prefetch data and the loop start prefetch data continuously at the end of loop-type data.

4. The method of claim 3, further comprising reading out discrete block data by the block size in the loop prefetch applied area in the address data area, by specifying the predetermined stride address from the prefetch start address.

5. A computer implemented prefetch instruction method comprising:
  setting a sum of a transfer data number and an incremental part of data transfer as a new number of transfer data;
  setting a sum of a transfer address and an address of the incremental part of data transfer as a new transfer address;
  judging whether the new transfer address is larger than a sum of a loop start address and a loop end offset;
  judging whether a block size of block data is equal to the new transfer data number if the new transfer address is smaller than the sum of the loop start address and the loop end offset;
  deleting backward data overflowing from a loop end and storing remaining forward data in a buffer if the new transfer address is larger than the sum of the loop start address and the loop end offset;
  obtaining data represented by a value obtained by subtracting a remaining part of the data transfer from the incremental part of the data transfer at a position of the loop start address and writing the data in a free space area of the buffer; and
  setting a sum of the new transfer address and an address corresponding to a value obtained by subtracting the remaining part of the data transfer from the incremental part of the data transfer as a further new transfer address.

6. The prefetch instruction method of claim 5, further comprising:
  storing the read-out data in a cache from the buffer if the block size is not equal to the new transfer data number;
  setting a value obtained by adding one to a transfer block number as a new transfer block number if the block size is equal to the new transfer data number;
  judging whether a prefetch block number is equal to the new transfer block number;
  finishing prefetch transfer if the prefetch block number is equal to the new transfer block number; and
  setting a sum of the new transfer address and a value obtained by subtracting the block size from the stride address as a block lead address if the prefetch block number is not equal to the new transfer block number.

7. A computer program product for executing an application on a signal processor, the computer program product comprising:
  instructions configured to set a sum of a transfer data number and an incremental part of data transfer as a new transfer data number;
  instructions configured to set a sum of a transfer address and an address of the incremental part of the data transfer as a new transfer address;
  instructions configured to judge whether the new transfer address is larger than a sum of a loop start address and a loop end offset;
  instructions configured to judge whether a block size is equal to the new transfer data number if the new transfer address is smaller than the sum of the loop start address and the loop end offset;
  instructions configured to delete backward data overflowed from a loop end and storing remaining forward data in a buffer if the new transfer address is larger than the sum of the loop start address and the loop end offset;
  instructions configured to obtain data represented by a value obtained by subtracting a remaining part of the data transfer from the incremental part of the data transfer at a position of a loop start address and write the data in a free space area of the buffer; and
  instructions configured to set a sum of the new transfer address and an address corresponding to a value obtained by subtracting the remaining part of the data transfer from the incremental part of the data transfer as a further new transfer address.

8. The computer program product of claim 7, further comprising:
  instructions configured to store the read-out data in a cache from a buffer if the block size is not equal to the new transfer data number;
  instructions configured to set a value obtained by adding one to a transfer block number as a new transfer block number if the block size is equal to the new transfer data number;
  instructions configured to judge whether a prefetch block number is equal to the new transfer block number;
  instructions configured to finish prefetch transfer if the prefetch block number is equal to the new transfer block number; and
  instructions configured to set a sum of the new transfer address and a value obtained by subtracting a block size from a stride address as a block lead address if the prefetch block number is not equal to the new transfer block number.

* * * * *